United States Patent [19]
Watanabe et al.

[11] Patent Number: 5,390,130
[45] Date of Patent: Feb. 14, 1995

[54] CAMERA BATTERY CHECKING APPARATUS

[75] Inventors: Akira Watanabe; Atsushi Maruyama; Touko Kobayashi; Azuma Miyazawa, all of Tokyo, Japan

[73] Assignee: Olympus Optical Co., Ltd., Tokyo, Japan

[21] Appl. No.: 793,614

[22] Filed: Nov. 18, 1991

[30] Foreign Application Priority Data

Nov. 28, 1990 [JP] Japan ................... 2-328330

[51] Int. Cl.⁶ .............................. G03B 17/18
[52] U.S. Cl. ................... 364/483; 364/481; 354/468
[58] Field of Search ............... 354/412, 468, 173.11; 307/66; 235/492; 340/636; 324/426, 435, 465, 473; 364/483, 481

[56] References Cited

U.S. PATENT DOCUMENTS

| | | | |
|---|---|---|---|
| 4,792,762 | 12/1988 | Shiina et al. | 324/426 |
| 4,816,862 | 3/1989 | Taniguchi et al. | 354/412 |
| 4,855,781 | 8/1989 | Hoshino | 354/468 |
| 4,912,499 | 3/1990 | Desormeaux | 354/468 |
| 4,999,665 | 3/1991 | Kuroda et al. | 354/468 |
| 5,072,103 | 12/1991 | Nara | 235/492 |
| 5,077,568 | 12/1991 | Maruyama | 354/173.11 |
| 5,081,483 | 1/1992 | Ishimura et al. | 354/412 |
| 5,105,180 | 4/1992 | Yamada et al. | 340/636 |
| 5,164,761 | 11/1992 | Isono et al. | 354/468 |
| 5,177,371 | 1/1993 | Faulk | 307/66 |

FOREIGN PATENT DOCUMENTS 60-220869 11/1985 Japan .

*Primary Examiner*—Vincent N. Trans
*Attorney, Agent, or Firm*—Frishauf, Holtz, Goodman & Woodward

[57] ABSTRACT

A CPU checks whether a content of a battery insertion detecting RAM has a predetermined bit configuration and whether a flag during battery check is set after power on reset. If neither the RAM has the bit configuration nor the flag is set, the flag is set and then a dummy current is caused to flow into a dummy load. When power consumption is high, the power supply voltage greatly drops within a predetermined period of time after the dummy load is turned on and therefore the voltage sensing IC detects the voltage drop and the CPU is reset. Since the CPU initializes all ports if it is subjected to hard reset, the current is stopped to flow into the dummy load and the power supply voltage is recovered. After the hard reset, the CPU checks the content of the RAM and the flag. Since the flag continues to be set, the CPU determines that the battery runs down and performs a battery run-down operation. When the battery is loaded, the RAM usually has a predetermined bit configuration. If the content of the RAM is checked, it is possible for the CPU to determine whether the hard reset is performed by loading the battery or it is performed since the voltage sensing IC detects a drop in the battery voltage during the battery check.

9 Claims, 9 Drawing Sheets

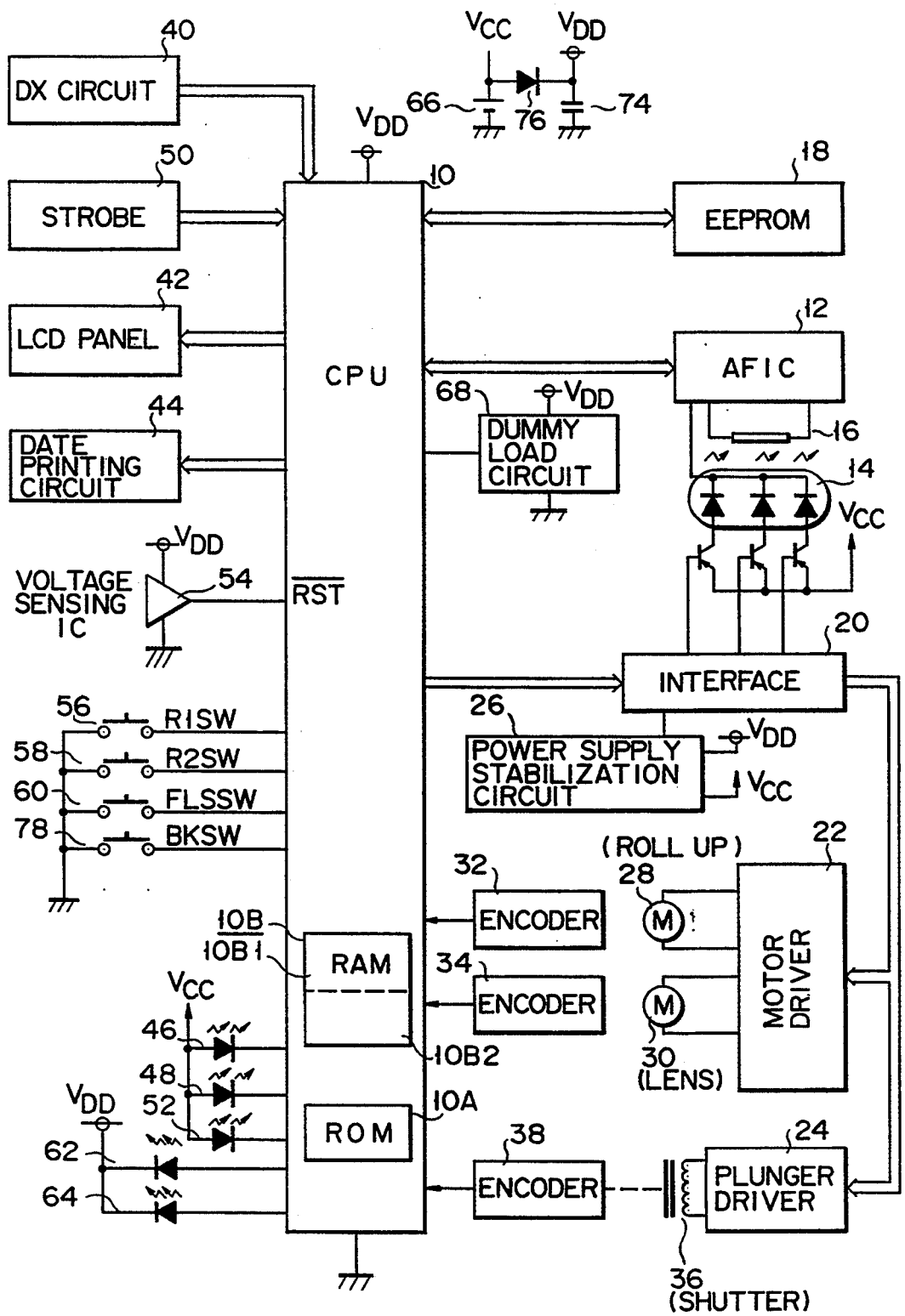
F I G. 2

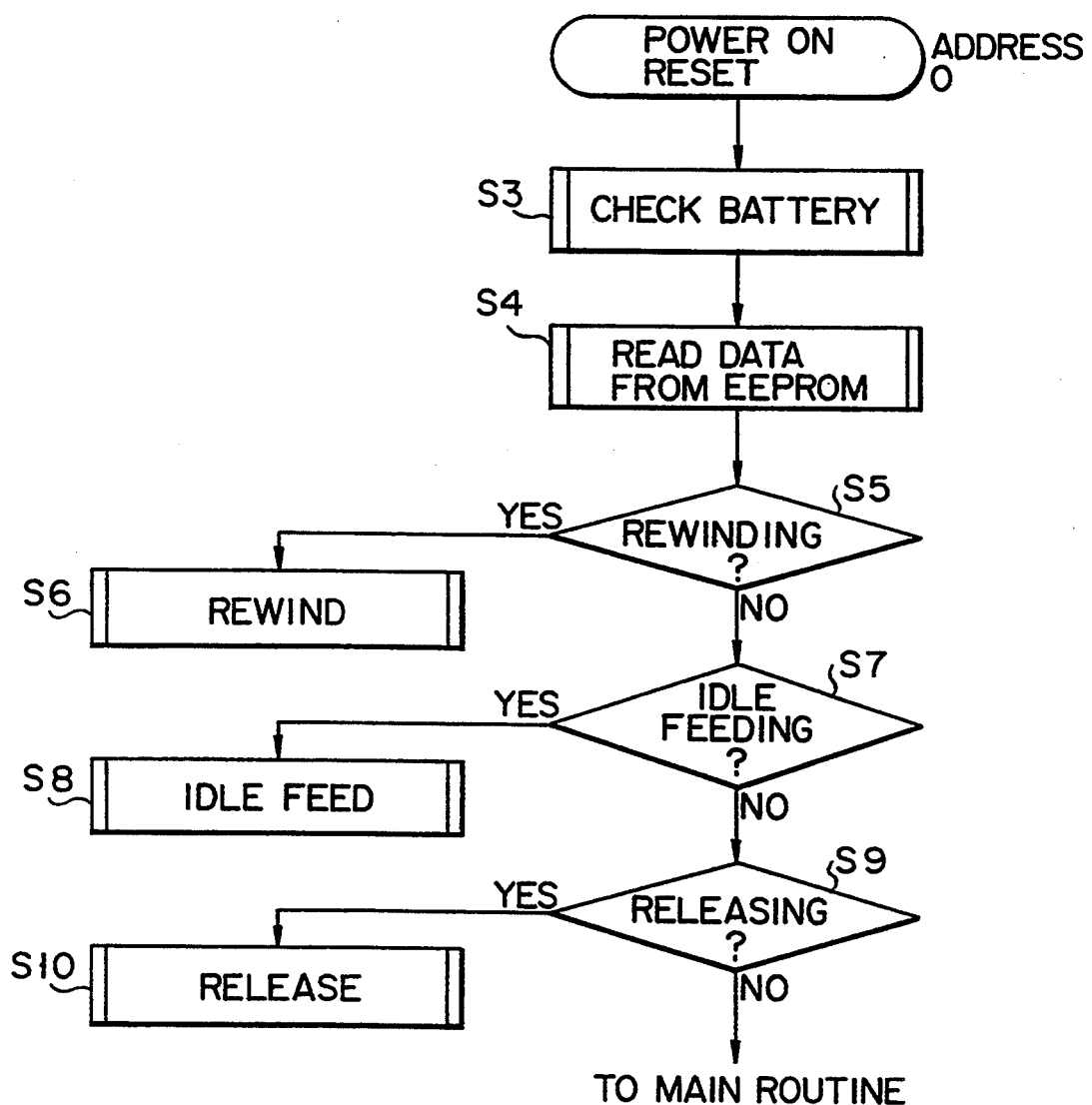
F I G. 4

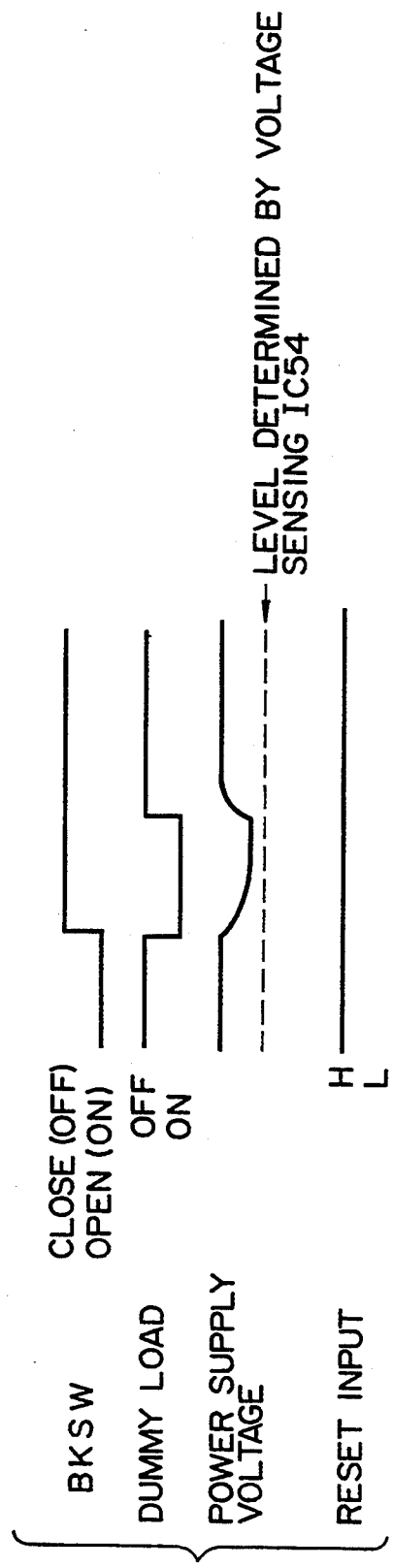
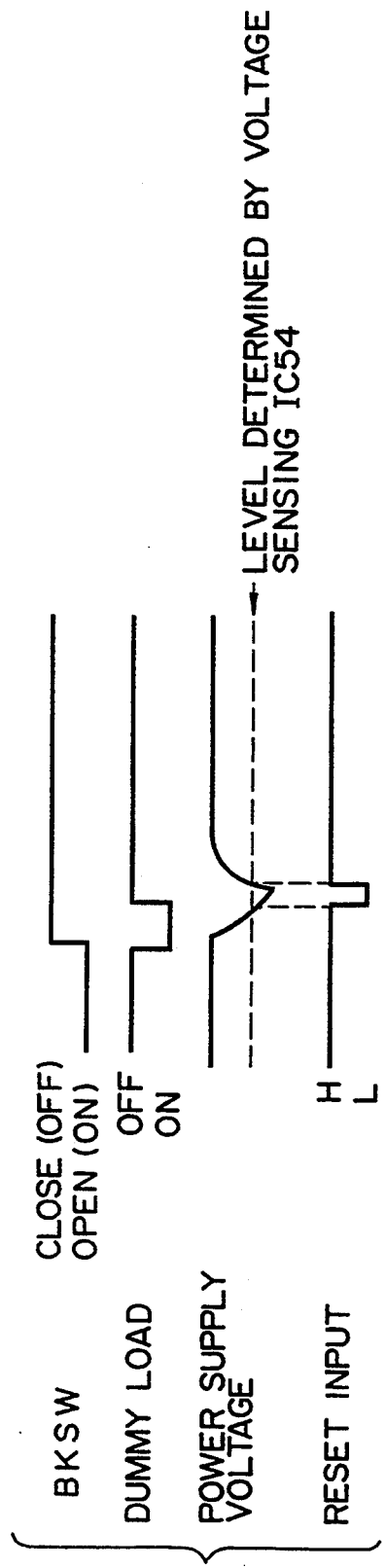

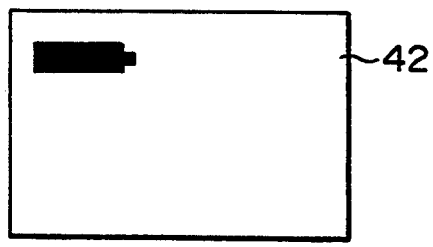
F I G. 8A
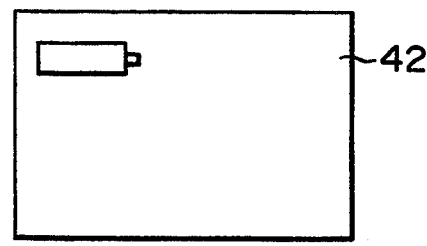
F I G. 8B
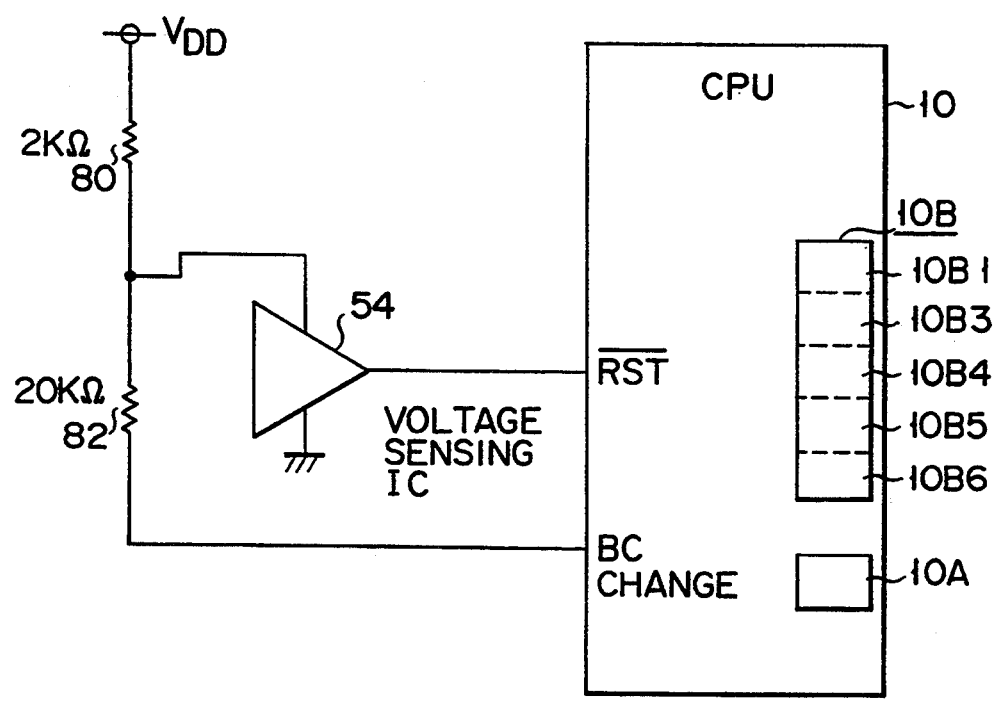
F I G. 9

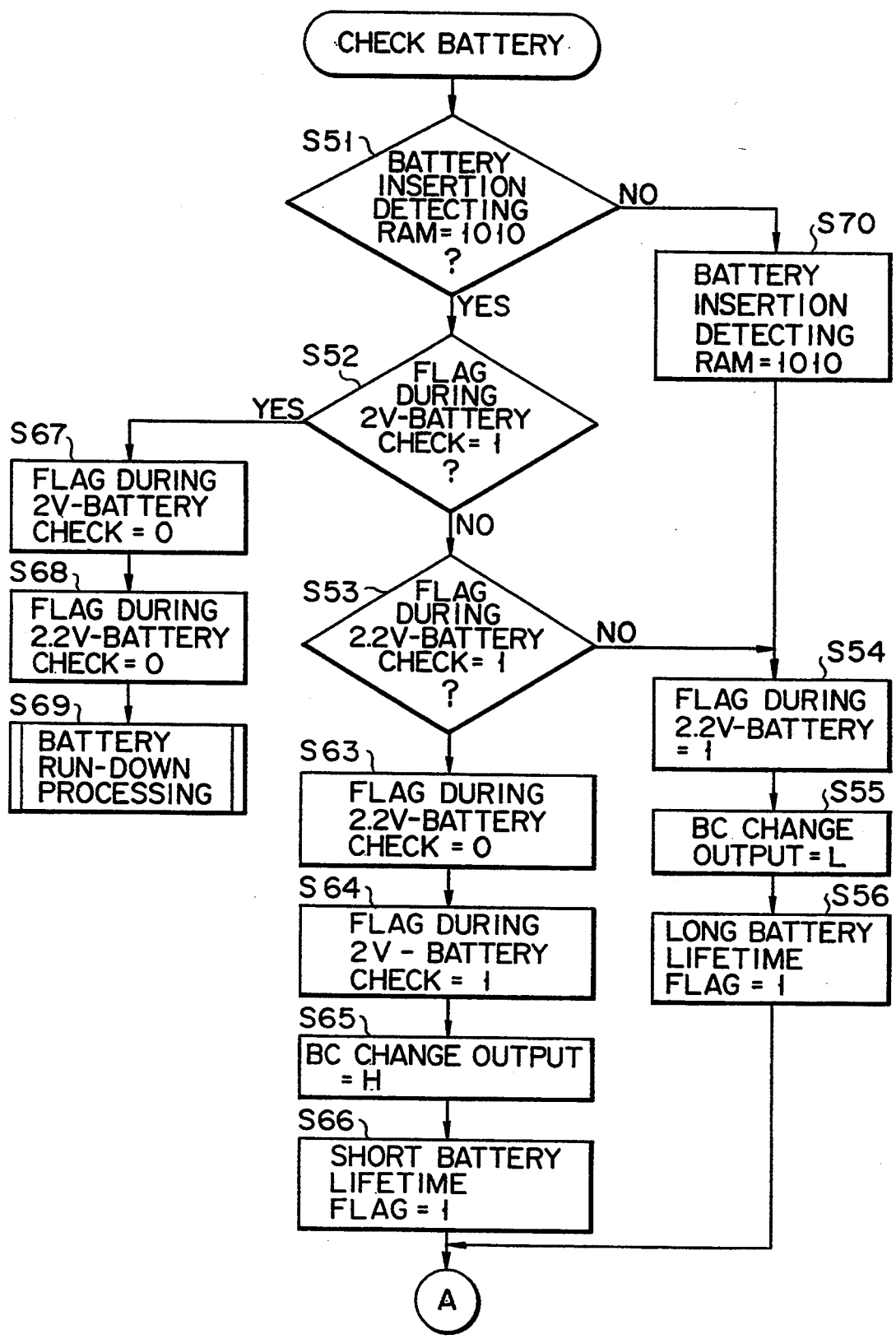
F I G. 10A

CAMERA BATTERY CHECKING APPARATUS

BACKGROUND OF THE INVENTION

1. Field of the Invention

The present invention relates to a battery checking apparatus of a camera controlled by a CPU.

2. Description of the Related Art

A conventional camera has a battery check system wherein a voltage detection circuit detects whether or not a power supply voltage is at not less than a predetermined level and supplies a result of the detection to a battery checking input terminal of a CPU, and the CPU controls the camera in accordance with the result supplied thereto. This battery check system is disclosed in, for example, Published Unexamined Japanese Patent Application No. 60-220869. The power supply voltage is usually detecting a closed-circuit voltage when current is caused to flow through a dummy load.

The CPU has a reset terminal for starting a sequence from its initial state when a power supply is turned on. The reset terminal continues to receive a reset signal until the power supply voltage reaches the predetermined value to prevent the CPU from malfunctioning when the power supply is turned on. The reset signal is usually generated from a reset circuit which monitors the power supply voltage.

A camera system using a CPU thus necessitates a voltage detection circuit for checking a battery and a reset circuit for performing a reset operation, and the CPU necessitates at least a terminal for receiving a result of battery check and a reset terminal.

Recently, the batteries of a camera have only to be exchanged with each other every several years. The reset circuit and reset terminal therefore operate only once for several years in common use of the camera.

The number of input/output terminals of the CPU and that of circuits mounted outside the CPU greatly affect simplification and low cost of the camera. It is desirable that an infrequently-used terminal or circuit having a single function, such as the above reset terminal and reset circuit, be reduced in number to the utmost.

If, however, both the voltage detection circuit and reset circuit are connected in common to the reset terminal, the above case where a battery is checked by causing current to flow through a dummy load, has the following drawback.

In power-on reset, when the voltage detection circuit detects that a voltage reaches a predetermined level from 0 level directly after power is turned on, the CPU is started. In battery check, when the voltage detection circuit detects that a power supply voltage is at not more than a predetermined level while current is flowing through the dummy load, it gives an alarm indicating shortage of battery voltage, and stops the current flowing through the dummy load. The voltage then increases and, in this case, the power supply voltage may exceed the detected level. In short, while the CPU is operated when the voltage changes from low to high in the power-on reset, the CPU must be prevented from operating when the voltage changes from low to high in the battery check.

SUMMARY OF THE INVENTION

The present invention has been made to overcome the above-described drawback and its object is to provide a camera battery checking apparatus in which a reset input terminal of a CPU carries out other functions as well as a function of detecting that a battery is loaded into a camera, to achieve low cost and simplification of the camera.

According to an aspect of the present invention, there is provided a camera battery checking apparatus having a dummy load circuit connected to a battery checking output port of a CPU, a voltage detecting circuit, connected to a reset terminal of the CPU, for supplying a reset signal to the CPU when a power supply voltage is not more than a predetermined level while the dummy load circuit is in a conductive state, starting means for starting a battery check operation, and first and second memory means, comprising:

first determination means for determining that a power supply has been just turned on when the first memory means does not have a predetermined bit configuration and that the power supply has not been just turned on when the first memory means has the predetermined bit configuration;

first setting means for setting the first memory means to have the predetermined bit configuration when the first determination means determines that the power supply has been Just turned on;

second determination means for determining whether a state signal indicative of a state of the battery check operation is set in the second memory means when the first determination means determines that the power supply has not been just turned on;

second setting means for setting the state signal in the second memory means after one of operations of the first determination means and the first setting means is performed;

conduction signal output means for supplying a conduction signal to the dummy load circuit for a predetermined period of time after an operation of the second setting means;

release means for releasing the state signal from the second memory means after a lapse of the predetermined period of time;

feedback means for operating the first and second determination means again when a reset signal is output from the voltage detecting circuit operated during the predetermined period of time; and display means for displaying that a shortage of voltage in the power supply when the second determination means determines that the state signal is set in the second memory means after the feedback means performs an operation.

According to another aspect of the present invention, there is provided a method of checking a battery of a camera having a CPU, comprising:

a first step of determining that a power supply has been just turned on when first memory means does not have a predetermined bit configuration and that the power supply has not been just turned on when the first memory means has the predetermined bit configuration, in response to one of a battery insertion operation and a battery check operation;

a second step of setting the first memory means to have the predetermined bit configuration when it is determined in the first step that the power supply has been just turned on;

a third step of determining whether a state signal indicative of a state of the battery check operation is set in second memory means when it is determined in the first step that the power supply has been not just turned on;

a fourth step of setting the state signal in the second memory means after one of the second and third steps;

a fifth step of causing a dummy load circuit to perform a conduction operation for a period of time;

a sixth step of releasing the state signal from the second memory means after a lapse of the predetermined period of time;

a seventh step of determining a power supply voltage when the dummy load circuit is turned on, inputting a reset signal to the CPU when the power supply voltage is not more than a predetermined level and stopping the conduction operation, the seventh step being performed during the predetermined period of time;

an eighth step of executing the first to third steps again after the conduction operation is stopped; and a ninth step of displaying a shortage of voltage in the power supply when the state signal is set in the second memory means in the third step after the eighth step.

In the apparatus and method of checking a camera battery, since an output signal of the voltage detection circuit is supplied to the reset terminal of the CPU, the CPU is reset when the voltage detection circuit detects that the power supply voltage of the camera drops to not more than a predetermined level.

In the battery check operation, the CPU causes dummy current to flow through the dummy load, and the power supply voltage is lowered. When the voltage detection circuit detects that the power supply voltage is lowered to not more than a predetermined level, an output signal of the voltage detection circuit is supplied to the reset terminal of the CPU, and the CPU is subjected to hard reset. The battery check operation is then released, the dummy current is prevented from flowing, and the power supply voltage increases again. If the power supply voltage exceeds the predetermined level, the CPU is released from its reset state and thus starts to operate from the initial address.

If the battery check operation is performed when the remaining battery capacity is small, the CPU is automatically reset. In other words, if the battery check operation is performed and then the CPU is reset, it can be determined that the remaining battery capacity is small.

Since the battery checking apparatus operates as a power-on reset circuit when batteries are exchanged, the above reset circuit is not required. To determine whether the reset is performed by the battery check operation or by the exchange of batteries, however, the state of the CPU is stored in the memory means (whose state is not changed by the reset) before the battery check operation and checked in the initial operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a system diagram showing the camera battery checking apparatus according to the first embodiment of the present invention;

FIGS. 3 to 5 are flowcharts showing operations of the camera battery checking apparatus according to the first embodiment of the present invention;

FIGS. 6 and 7 are time charts representing sequences the operations of the camera battery apparatus in which a power supply voltage is high and low, respectively;

FIGS. 8A and 8B are views each showing a remaining battery capacity of the camera battery checking apparatus according to the first embodiment of the present invention, in which FIG. 8A shows a considerably large remaining battery capacity and FIG. 8B shows that the battery runs down;

FIG. 9 is a view showing a camera battery checking apparatus according to a second embodiment of the present invention;

FIGS. 10A and 10B are flowcharts showing operations of the camera battery checking apparatus according to the second embodiment of the present invention; and FIGS. 11A to 11C are views each showing a remaining battery capacity of the camera battery checking apparatus according to the second embodiment of the present invention, in which FIG. 11A shows a considerably large remaining battery capacity, FIG. 11B shows a small remaining battery capacity, and FIG. 11C shows that the battery runs down.

DETAILED DESCRIPTION OF THE PREFERRED EMBODIMENTS

Figure 1:
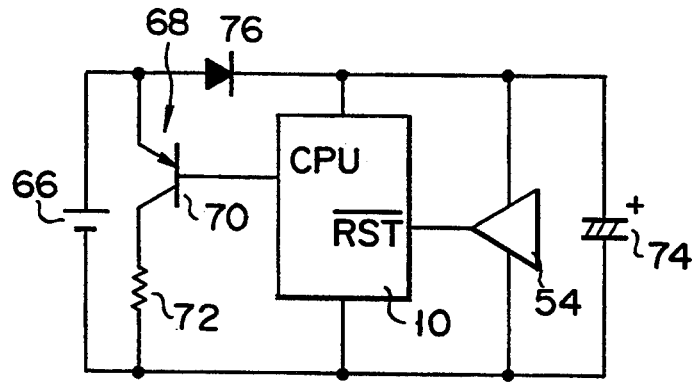
FIG. 1 is a block diagram showing a characteristic part of a camera battery checking apparatus according to a first embodiment of the present invention.

FIG. 1 is a block diagram showing a characteristic part of a camera battery checking apparatus according to a first embodiment of the present invention, and FIG. 2 is a system diagram showing the camera battery checking apparatus. As shown in FIG. 2, a CPU 10 includes a ROM 10A, and executes a sequential control operation based on a program stored in the ROM 10A to control the operations of peripheral circuits such as ICs. The CPU 10 also includes a RAM 10B constituted of a battery insertion detecting RAM 10B1 and a flag during battery check 10B2.

An auto-focus integrated circuit (AFIC) 12 measures a distance from the camera to an object by an infrared active method and transfers information of the distance to the CPU 10 by way of 8-bit serial communications. The AFIC 12 is able to measure distances from the camera to three points within a photographing image plane using a light projector/receiver. The light projector/receiver includes three near-infrared light emitting diodes (IRED) 14 for projecting light and a single position sensing device (PSD) 16 for receiving light.

An EEPROM 18 is a nonvolatile storage element for storing adjustment data for, when the camera is produced, correcting errors due to dispersion of the measured distances, dispersion of positions of a lens caused when the measured distances are converted into lens position data, or the like.

An interface 20 drives the IRED 14, a motor driver 22, a pre-driver of plunger driver 24, and a stabilization circuit 26 of a CPU power supply $V_{DD}$, in response to a signal output from the CPU 10.

The motor driver 22 drives a film feeding motor 28 and a photographic lens driving motor 30. The film feeding state is detected by an encoder 32 and the driving position of a photographic lens (not shown) is detected by an encoder 34, and information of the detected feeding state and driving position is supplied to the CPU 10.

A shutter (not shown) is driven by a plunger 36. The opening of the shutter is detected by an encoder 38, and information of the opening is supplied to the CPU 10.

A DX circuit 40 detects an ISO sensitivity of a film and supplies information of the sensitivity to the CPU 10. A liquid crystal display panel 42 displays a mode, the number of frames, and the like in response to the output signal of the CPU 10. A date printing circuit 44 prints a date on the film in response to the output signal of the CPU 10.

Light emitting diodes (LEDs) 46 and 48 are indicating lamps in a finder for raising an alarm for completion of AF ranging and short distance, an alarm for strobe light, an alarm for appearance of "red eyes," etc. The appearance of "red eyes" is a phenomenon in which eyes of an object become red when the object is photographed by flashing a stroboscope 50, and the alarm of the "red eyes" appearance is intended to urge a user to select a red-eyes mode, which will be described later, when the red-eyes phenomenon is detected in advance. An LED 52 is a light emitting diode for displaying a self mode.

A voltage sensing (or detecting) IC 54 is an integrated circuit for power-on reset of the CPU 10. More specifically, the voltage sensing IC 54 keeps the CPU 10 in a reset state until the power supply voltage $V_{DD}$ of the CPU 10 reaches a voltage capable of operating the CPU 10 when the battery is loaded into the camera, and is operated so as to prevent the CPU 10 from running away even when the power supply voltage $V_{DD}$ is temporarily cut off.

A first release switch (R1SW) 56 is operated when a release button (not shown) is semi-depressed. If the switch 56 is turned on, a ranging operation is performed and a ranging value is stored in the CPU 10.

A second release switch (R2SW) 58 is operated when the release button is completely depressed. If the switch 58 is turned on, the photographic lens is driven based on the ranging value, and exposure is controlled based on a photometric value.

A strobe mode selecting switch (FLSSW) 60 is a switch for selecting one of a red-eyes flash mode, a strobe off mode, and a strobe forced flash mode. The red-eyes flash mode has a strobe photographic function for preventing the red-eyes phenomenon from occurring. Silicon photo diodes (SPDs) 62 and 64 are light receiving elements for spot photometry and average photometry.

The voltage sensing IC 54 is used to detect the consumption of a battery 66 before a great load is applied to the battery 66. More specifically, the voltage sensing IC detects whether the voltage of the battery drops below a predetermined level when a transistor 70 of a dummy load circuit 68 as shown in FIG. 1 is turned on to cause dummy load current to flow through a dummy load 72.

A capacitor 74 and a diode 76 constitute a power supply filter. A back switch (BKSW) 78 is turned on/off by opening/closing the back of the camera.

Figure 3:
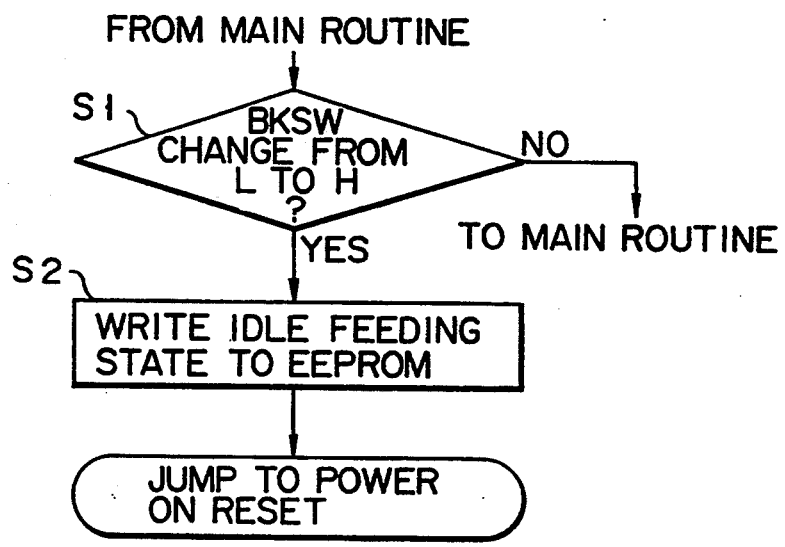

An operation of the camera battery checking apparatus according to the first embodiment of the present invention will be described in detail with reference to the flowcharts shown in FIGS. 3 through 5.

The program of CPU 10 usually waits for data input by an operation button or the like in the main routine. If the closed back of the camera is opened and closed in sequence, the BKSW 78 is turned on and turned off, and the CPU 10 detects this switching operation. In the flowchart shown in FIG. 3, the CPU 10 detects a change from L to H (from ON to OFF) of the BKSW 78 (step S1), and writes an idle feeding state to the EEPROM 18 (step S2). A flow then jumps to POWER ON RESET (address 0).

Moving to the flowchart shown in FIG. 4, a subroutine of "chick battery" is called immediately after the POWER ON RESET (step S3).

Figure 5:
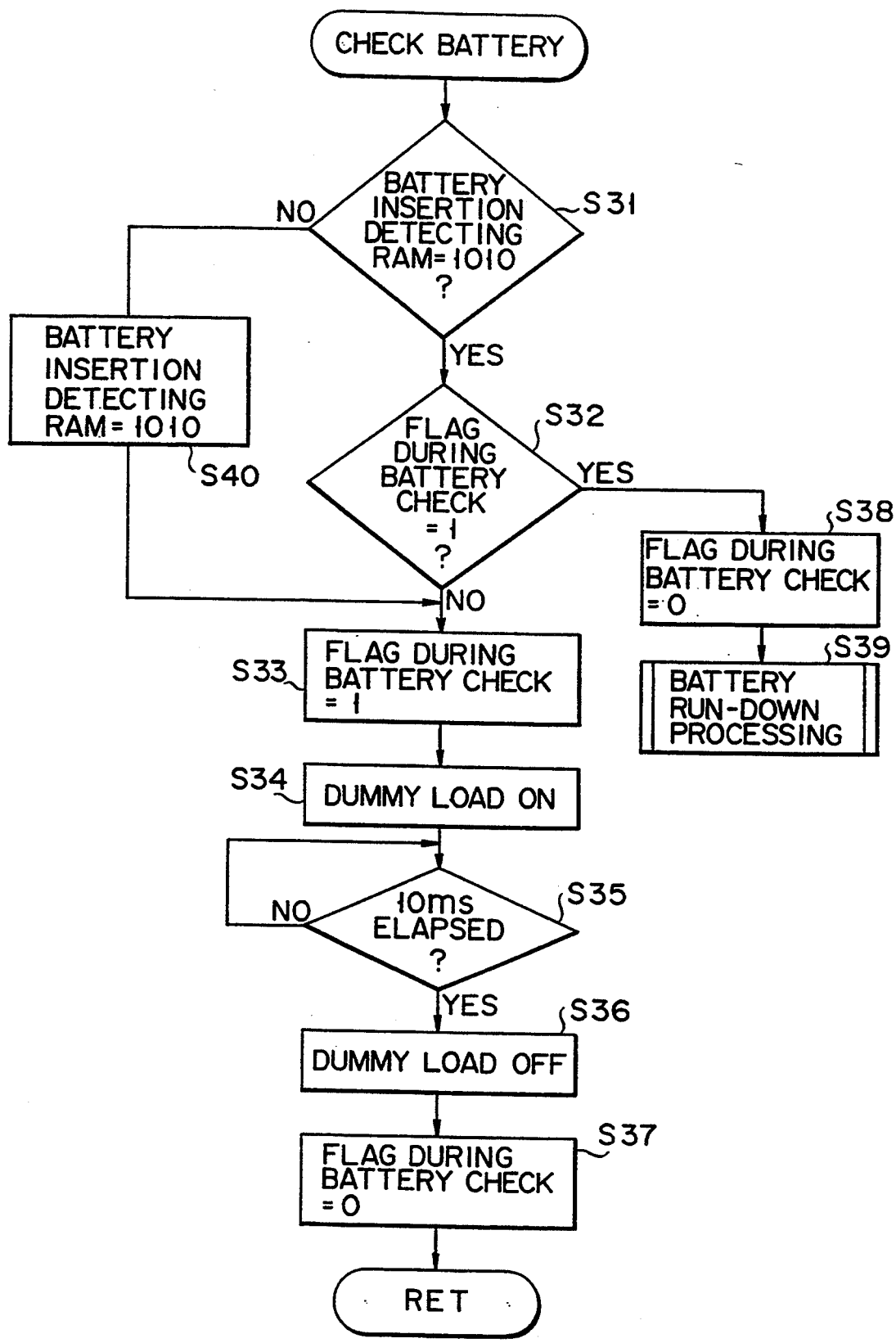

Moving to the flowchart shown in FIG. 5, it is checked whether the battery insertion detecting RAM 10B1 of the RAM 10B included in the CPU 10 has data of "1010" (step S31). The significance of "1010" will be described later. The battery insertion detecting RAM has "1010" except immediately after the battery is loaded. Data other than "1010," which is obtained immediately after the battery is loaded, will also be described later.

If the battery insertion detecting RAM has "1010," it is checked whether the flag during battery check 10B2 of the RAM 10B is "0" or not (step S32). Since the flag during battery check 10B2 is usually "0" for the reason described later, the flag is set to "1" (step S33) and then the dummy load 72 is turned on (step S34). Unless the voltage sensing IC 54 detects that the power supply voltage drops below a predetermined level within a predetermined period of time (10 ms in FIG. 5) (step S35), the dummy load 72 is turned off (step S36), and the flag during battery check is set to "0" (step S37), resulting in return to the flowchart shown in FIG. 4. The above sequence is represented by the time chart shown in FIG. 6.

The dummy load 72 is turned on/off by turning on/off the transistor 70 by the CPU 10.

Returning to the flowchart shown in FIG. 4, the CPU 10 reads data written in the EEPROM 18 in the step S2 (step S4), confirms an idle feeding state, and starts an idle feeding operation (steps S5 to S10).

The above operation is performed when a remaining battery capacity is large.

Next, a case where battery consumption is too high to perform the idle feeding operation, will be described. In this case, since the power supply voltage greatly drops within a predetermined period of time (10 ms in FIG. 5), after the dummy load 72 is turned on in the flowchart shown in FIG. 5, the voltage sensing IC 54 detects the voltage drop to reset the CPU 10. Since the reset CPU 10 initializes all ports, no current flows through the transistor 70 and dummy load 72, and the power supply voltage is then recovered. The above sequence is represented by the time chart shown in FIG. 7.

Since the CPU 10 is reset, the program jumps to the POWER ON RESET of the flowchart shown in FIG. 4, and moves again to the subroutine of "check battery" in the flowchart shown in FIG. 5. Since the flag during battery check 10B2 represents "1" (step S32), the CPU 10 determines that the battery runs down and sets the flag during battery check 10B2 to "0" (steps S38). Battery run-down processing is then executed to raise an alarm for release lock, shortage of power, etc. (step S39), and no idle feeding operation is performed.

If the flag indicating the battery check is put up in the RAM 10B, even when a result of the battery check represents hard reset, the subsequent operations can be continued based on the result.

A case where power is turned on, for example, a battery is loaded, will be described.

The data of the RAM 10B is indefinite when the battery is loaded. Judging from the subroutine of the battery check shown in FIG. 5, there is possibility that the flag during battery check 10B2 will represent "1" and, in this case, the battery insertion detecting RAM 10B1 is arranged so as not to perform the battery run-down processing by mistake. Though the data of the RAM 10B is indefinite when the battery is inserted, the respective bits of one byte have the same polarity. In other words, since the data of the battery insertion detecting RAM 10B1 usually represents "1111" or "0000" when power is turned on, it can be determined from the data of the RAM 10B1 whether the hard reset is performed by loading the battery or by detecting a voltage drop while the voltage sensing IC 54 is checking the battery. As shown in FIG. 5, if the data of the RAM 10B1 does not represent "1010" in the "check battery" routine, the flow does not go to the step S39 of the battery run-down processing. (As described above, the data of the RAM 10B1 represents "1111" or "0000" when it is set up. If "1010," which is the most different in bit configuration than "1111" or "0000," is used as reference data, it can be understood that data having a bit configuration other than "1010" represents that power is on.) If the data of the RAM 10B1 does not represent "1010," it is set to "1010" (step S40) and then the flag during battery check 10B2 is set to "1" (step S33).

As a result of the battery check, a battery-shaped indicator is displayed blackly on the liquid crystal display panel 42 when the battery is full, as shown in FIG. 8A, and it is displayed as an outline on the panel 42 when the battery is empty, as shown in FIG. 8B.

In the first embodiment, one voltage level is detected. However, a plurality of voltage levels can be detected and, in other words, a plurality of battery consumption states can be detected, which will be described as the second embodiment according to the present invention. In the second embodiment, three cases can be displayed in which a battery voltage is considerably high, it is low, and a battery is dead.

In the second embodiment of the present invention, the voltage sensing IC 54 and CPU 10 are connected as shown in FIG. 9, and the CPU 10 includes two flags during battery check, that is a flag during 2 V battery check 10B3 and a flag during 2.2 V battery check 10B4 and also includes a long battery lifetime flag 10B5 and a short battery lifetime flag 10B6.

In the circuit arrangement shown in FIG. 9, if the level of an output terminal BC CHANGE of the CPU 10 is changed to "L" or "H," a voltage detected by the voltage sensing IC 54 can seemingly be changed. If the voltage sensing by the voltage sensing IC 54 is 2.0 V and the output terminal BC CHANGE is set at "L" in level, a power supply voltage is divided by resistors 80 and 82, and the divided voltage is supplied to the voltage sensing IC 54, thereby making it possible to detect the power supply voltage of 2.2 V.

Figure 10B:
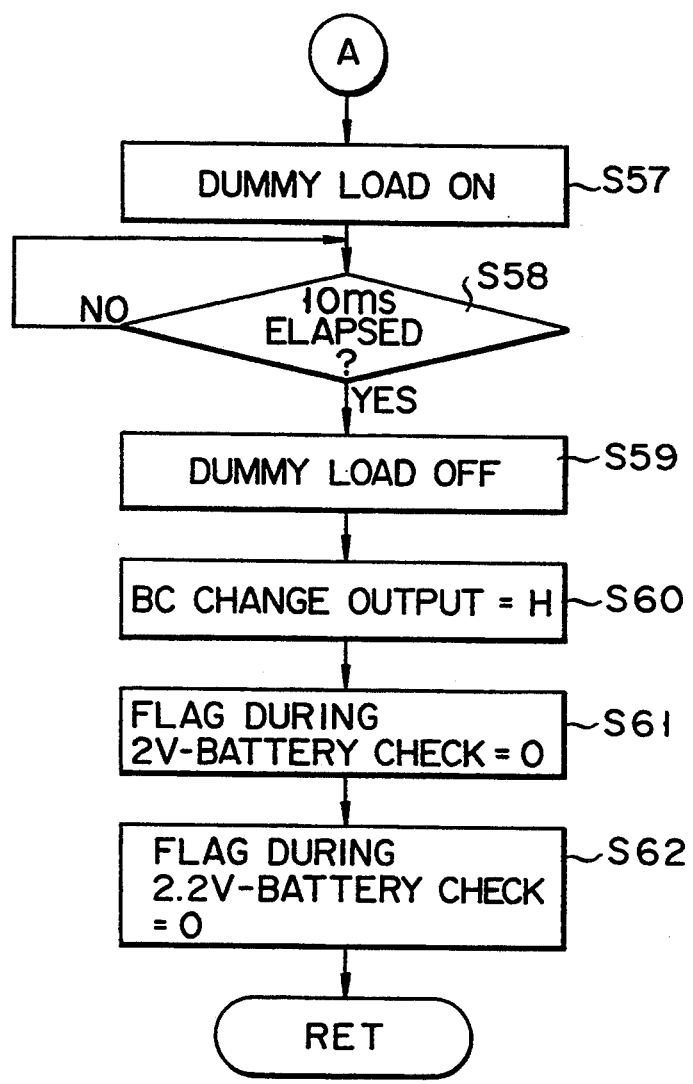

As shown in the flowcharts of FIGS. 10A and 10B, it is first detected whether a battery is loaded or not in a subroutine of "check battery" (step S51). This step is the same as step S31 of the first embodiment. Since both the flag during 2 V battery check 10B3 and flag during 2.2 V battery check 10B4 are "0" when a battery check operation is started (steps S52 and S53), the flag during 2.2 V battery check 10B4 is set to "1" (step S54) and the output terminal BC CHANGE is set to "L" (step S55). The long battery lifetime flag 10B5 is set to "1" (step S56).

The dummy load 72 is then turned on (step S57) and, if the remaining battery capacity is considerably large, the power supply voltage does not exceed 2.2 V, thereby going out of the subroutine after a lapse of 10 ms (step S58). In other words, unless the voltage sensing IC 54 does not detect a voltage drop down to 2 V or less before a lapse of 10 ms, the dummy load 72 is turned off (step S59), then the output terminal BC CHANGE is set to "H" (step S60), and the flag during 2 V battery check 10B3 and flag during 2.2 V battery check 10B4 are reset to "0" (step S61, S62). Only the long battery lifetime flag 10B5 is thus left, and the CPU 10 is able to recognize that the remaining battery capacity is large.

When the remaining battery capacity is very small, the power supply voltage is 2.2 V or less while the dummy load 72 is turning on in the flowcharts shown in FIGS. 10A and 10B. An output of the voltage sensing IC 54 is thus reversed, and the CPU 10 is subjected to hard reset. If the hard reset is performed, the "check battery" routine is called again from the initial address shown in FIG. 4. Since the flag during 2.2 V battery check 10B4 continues to be set to "1," it is reset to "0" (step S63) and the flag during 2 V battery check 10B3 is set to "1" instead (step S64). The output terminal BC CHANGE is then set at "H" in level (step S65) so that the output of the voltage sensing IC 54 is reversed when the power supply voltage is 2.0 V. The short battery lifetime flag 10B6 is also set to "1" (step S66).

The dummy load 72 is then turned on. In the second embodiment, while the dummy load is turning on, the battery 66 has a voltage of 2.2 V or more when its remaining battery capacity is large, 2.0 to 2.2 V when its remaining battery capacity is very small, and 2 V or less when the battery runs down. No hard reset is performed within a period of 10 ms, and the flow goes out of the subroutine. As a result, the short battery lifetime flag 10B6 remains, and the CPU 10 detects that the battery is about to run down.

Finally, when the battery runs down, hard reset is performed in the above case where the dummy load 72 is turned on for the second time when the battery is about to run down. The "check battery" routine is called for the third time, and it is detected that the flag during 2 V battery check 10B3 "1" (step S52). The flow then jumps to a routine for performing a battery run-down operation and, more specifically, a predetermined battery run-down operation is performed (step S69) after both the flag during 2 V battery check 10B3 and flag during 2.2 V battery check 10B4 are reset to "0" (steps S67 and S68).

When the battery is loaded, the battery insertion detecting RAM 10B1 represents "1111" or "0000." If the RAM 10B1 does not represent "1010," it is set to represent "1010" (step S70), and the flow goes to step S54 for setting the flag during 2.2 V battery check 10B4 to "1."

Figure 11A:
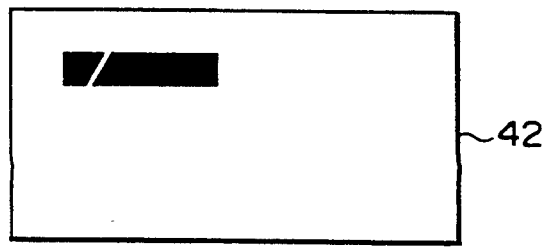
Figure 11B:
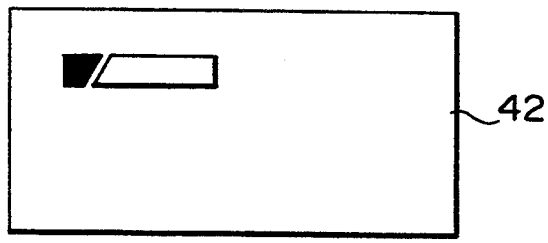
Figure 11C:
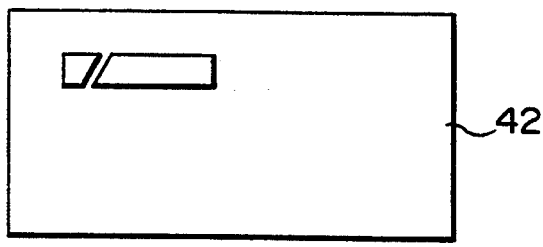

The results of the plural voltage levels detected by the voltage sensing IC can be known to a user by displaying the remaining battery capacity on the liquid crystal display panel 42, as shown in FIGS. 11A to 11C.

As described above, the reset terminal RST of the CPU 10 and the input terminal of the voltage sensing IC can be used in common, resulting in reduction in the number of terminals of the CPU 10. Furthermore, the voltage sensing IC 54 for checking a battery can be used as a conventional reset circuit for performing a reset operation.

The reset input terminal of the CPU can be used to carry out functions as well as the function of detecting that the battery is loaded into the camera, thereby to achieve low cost and simplification of the camera.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A camera battery checking apparatus having a dummy load circuit connected to a battery checking output port of a CPU, a voltage detecting circuit, connected to a reset terminal of the CPU, for supplying a reset signal to the CPU when a power supply voltage is not more than a predetermined level while the dummy load circuit is in a conductive state, starting means for starting a battery check operation, and first and second memory means, the camera battery checking apparatus further comprising:

first determination means for determining that a power supply has been just turned on when the first memory means does not have a predetermined bit configuration, and that the power supply has not been just turned on when the first memory means has the predetermined bit configuration;

first setting means for setting the first memory means to have the predetermined bit configuration when said first determination means determines that the power supply has been just turned on;

second determination means for determining whether a state signal indicative of a state of the battery check operation is set in the second memory means when said first determination means determines that the power supply has not been just turned on;

second setting means for setting the state signal in the second memory means after one of operations of said first determination means and said first setting means is performed;

wherein at least said first and second determination means and said first and second setting means form a single circuit means in said CPU;

conduction signal output means for supplying a conduction signal to the dummy load circuit for a predetermined period of time after an operation of said second setting means;

release means for releasing the state signal from said second memory means after a lapse of the predetermined period of time;

feedback means for operating said first and second determination means again when a reset signal is output from the voltage detecting circuit operated during the predetermined period of time; and display means for displaying that a shortage of voltage in the power supply when said second determination means determines that the state signal is set in the second memory means after said feedback means performs an operation.

2. The apparatus according to claim 1, further comprising means for causing the voltage detecting circuit to detect a plurality of voltage levels in a time sequence.

3. A method for checking a battery of a camera having a CPU, comprising:

a first step of determining that a power supply has been just turned on when a first memory means does not have a predetermined bit configuration, and that the power supply has not been just turned on when the first memory means has the predetermined bit configuration, in response to one of a battery insertion operation and a battery check operation;

a second step of setting the first memory means to have the predetermined bit configuration when it is determined in said first step that the power supply has been just turned on;

a third step of determining whether a state signal indicative of a state of the battery check operation is set in a second memory means when it is determined in said first step that the power supply has been not just turned on;

a fourth step of setting the state signal in the second memory means after one of said second and third steps;

wherein at least said first, second, third and fourth steps are carried out in a single circuit included in said CPU;

a fifth step of causing a dummy load circuit to perform a conduction operation for a period of time;

a sixth step of releasing the state signal from the second memory means after a lapse of the predetermined period of time;

a seventh step of determining a power supply voltage when the dummy load circuit is turned on, inputting a reset signal to the cpu when the power supply voltage is not more than a predetermined level and stopping the conduction operation, the seventh step being performed during the predetermined period of time;

an eighth step of executing said first to third steps again after the conduction operation is stopped; and a ninth step of displaying a shortage of voltage in the power supply when the state signal is set in the second memory means in said third step after the eighth step.

4. A camera comprising:

an arithmetic unit for controlling an operation of the camera;

a reset terminal included in said arithmetic unit, for performing power a on reset when a battery is loaded into the camera;

determination means for determining whether or not the battery has been just loaded in the camera;

a dummy load circuit including a dummy load having a load capacity which is substantially equal to a member having a largest load capacity in the camera; and a power supply voltage detecting circuit for receiving an operation signal from said arithmetic unit in association with a power supply voltage check operation of the camera to turn on said dummy load within a predetermined period of time and to detect a power supply voltage when said dummy load is turned on, and for supplying a reset signal to said reset terminal when the power supply voltage is not more than a predetermined level;

wherein at least said determination means and said power supply voltage detecting circuit are included in said arithmetic unit as a single circuit; and wherein said arithmetic unit determines whether said arithmetic unit causes the camera to perform an alarm operation on the basis of a signal output from said determination means.

5. A battery checking apparatus for use in a camera having a cpu, comprising:

a switching element connected to a port for controlling the CPU;

a load resistor connected to said switching element such that a battery check dummy current flows through said load resistor when said switching element is turned on; and a reset circuit connected to a reset terminal of the CPU, for resetting the CPU when a battery voltage is not more than a predetermined level, wherein said CPU comprises a single circuit which includes:

memory means for storing a state signal representing that a battery check operation is being performed;

first means for causing said memory means to store the state signal before the battery check operation is started, for turning on said switching element, and, if the reset terminal is not supplied with a reset signal from said reset circuit within a predetermined period of time, for determining that a remaining battery capacity is large and clearing the state signal from said memory means; and second means for checking a content of said memory means immediately after a power on reset, and for determining that a remaining battery capacity is small when the state signal is stored in said memory means.

6. The apparatus according to claim 5, wherein said reset circuit comprises a voltage detecting integrated circuit for generating a detection signal as the reset signal when an input voltage is lower than a predetermined threshold level.

7. A battery checking apparatus for use in a camera, comprising:

a CPU for performing an operation of the camera;

a dummy load circuit connected to a port for controlling said CPU, for causing a current to flow into a dummy load in response to a control signal of said CPU; and a reset circuit connected to a reset terminal of said CPU, for resetting said CPU when a battery voltage is not more than a predetermined level, wherein said CPU comprises a single circuit which includes:

memory means for storing a state signal representing that a battery check operation is being performed before a battery check operation is performed;

current control means for controlling said dummy load circuit to cause a dummy current to flow through said dummy load; and determination means for checking a content of said memory means after a power on reset, and for determining that a remaining battery capacity is small when the state signal is stored in said memory means.

8. The apparatus according to claim 7, wherein said determination means includes means for checking whether batteries are exchanged or not.

9. The apparatus according to claim 7, wherein said single circuit of said CPU further includes means for determining that a remaining battery capacity is considerably large when no reset is caused by said reset circuit even if the dummy current is caused to flow through said dummy load for a predetermined period of time.

* * * * *